(12) United States Patent
Kubota et al.

(10) Patent No.: US 10,227,072 B2
(45) Date of Patent: Mar. 12, 2019

(54) TRAVEL CONTROL DEVICE

(71) Applicant: HONDA MOTOR CO., LTD., Tokyo (JP)

(72) Inventors: Daisuke Kubota, Wako (JP); Haruhiko Nishiguchi, Wako (JP); Satoshi Fujii, Wako (JP); Ryohsaku Arakawa, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/612,073

(22) Filed: Jun. 2, 2017

(65) Prior Publication Data

US 2017/0349172 A1  Dec. 7, 2017

(30) Foreign Application Priority Data

Jun. 3, 2016  (JP) .................................. 2016-111949

(51) Int. Cl.
*B60W 30/09* (2012.01)
*B60W 30/18* (2012.01)

(52) U.S. Cl.
CPC ...... *B60W 30/09* (2013.01); *B60W 30/18163* (2013.01); *B60W 2550/10* (2013.01); *B60W 2550/14* (2013.01)

(58) Field of Classification Search
CPC .......................... B60W 30/09; B60W 2550/10
See application file for complete search history.

(56) References Cited

U.S. PATENT DOCUMENTS

| 5,594,414 A * | 1/1997 | Namngani ............. B60Q 9/008 180/168 |
| 9,527,441 B2 * | 12/2016 | Matsumura ............. B60Q 9/00 |
| 9,902,398 B2 * | 2/2018 | Takahashi ........... B60W 30/143 |
| 2012/0323473 A1 * | 12/2012 | Irie ....................... B60W 10/06 701/117 |
| 2016/0264047 A1 * | 9/2016 | Patel ..................... B60Q 9/008 |
| 2016/0288707 A1 * | 10/2016 | Matsumura ............. B60Q 9/00 |
| 2016/0318518 A1 * | 11/2016 | Suzuki ............ B60W 30/18163 |

(Continued)

FOREIGN PATENT DOCUMENTS

| JP | 2002-92795 A | 3/2002 |
| JP | 2002-274215 A | 9/2002 |
| JP | 2010-211299 A | 9/2010 |

OTHER PUBLICATIONS

Office Action dated Jan. 9, 2018, issued in counterpart Japanese Application No. 2016-111949, with English machine translation. (6 pages).

*Primary Examiner* — Alex C Dunn
(74) *Attorney, Agent, or Firm* — Westerman, Hattori, Daniels & Adrian, LLP

(57) ABSTRACT

A travel control device includes an acquisition section configured to acquire, as surroundings information while a vehicle itself is traveling, at least information regarding a first other vehicle ahead in a traveling direction and information regarding lane markings of a first lane in which the vehicle itself is traveling. The travel control unit further includes a travel control section ECU configured to compute from the information acquired by the acquisition section a separation between the first other vehicle and the lane markings, and to control travel of the vehicle itself based on the separation.

11 Claims, 10 Drawing Sheets

(56) References Cited

U.S. PATENT DOCUMENTS

| | | | |
|---|---|---|---|
| 2017/0017239 A1* | 1/2017 | Kanai | G05D 1/02 |
| 2017/0032680 A1* | 2/2017 | Imai | G08G 1/168 |
| 2017/0137033 A1* | 5/2017 | Habu | B60W 10/04 |
| 2017/0291603 A1* | 10/2017 | Nakamura | B60W 30/09 |
| 2018/0129206 A1* | 5/2018 | Harada | B60Q 1/346 |

* cited by examiner

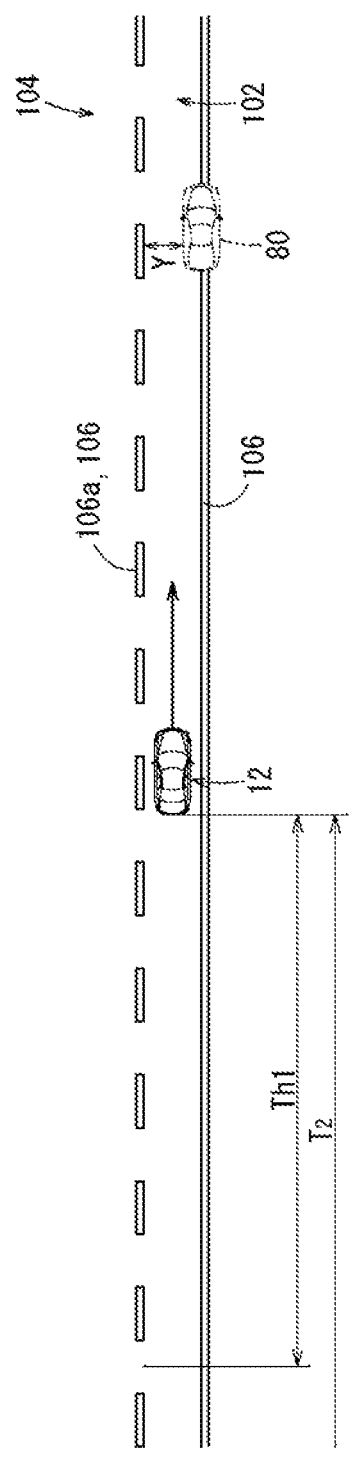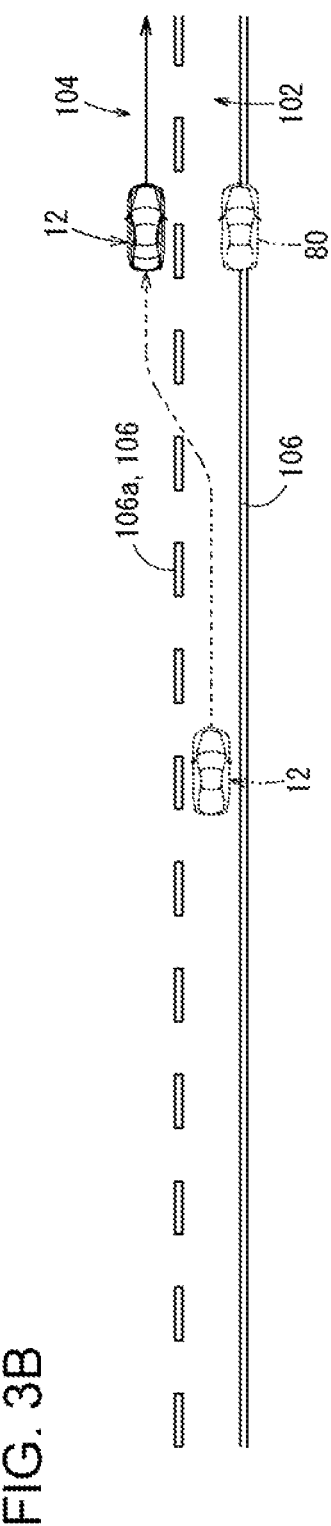

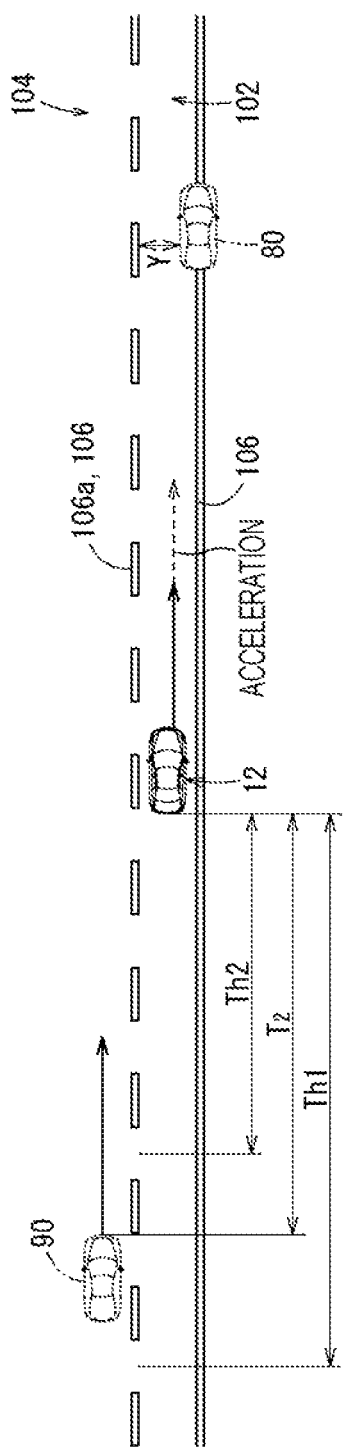
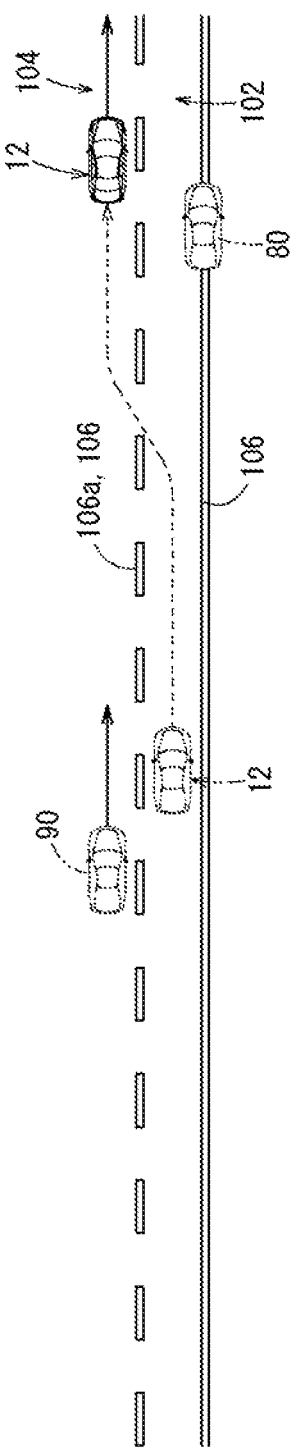

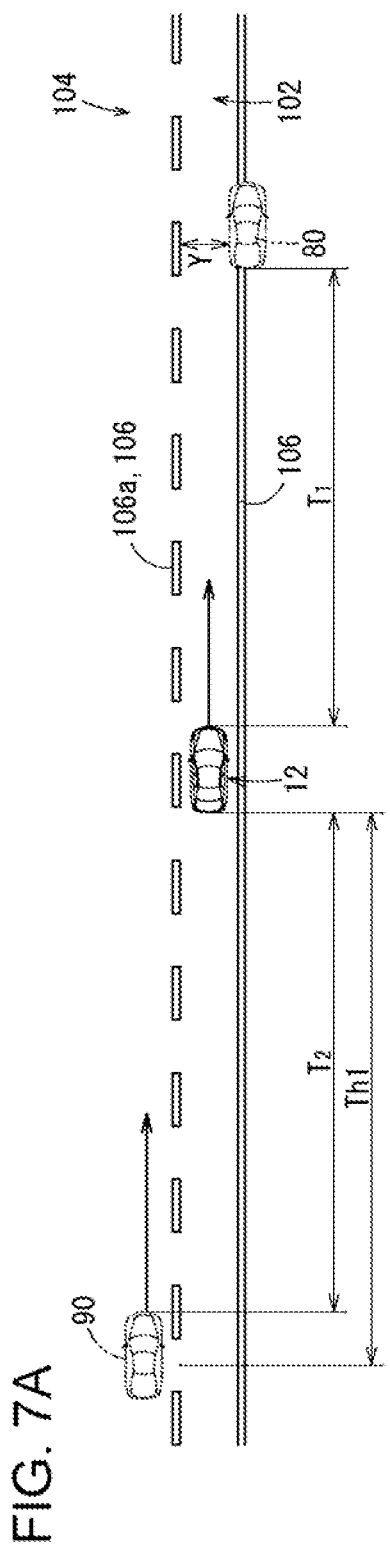
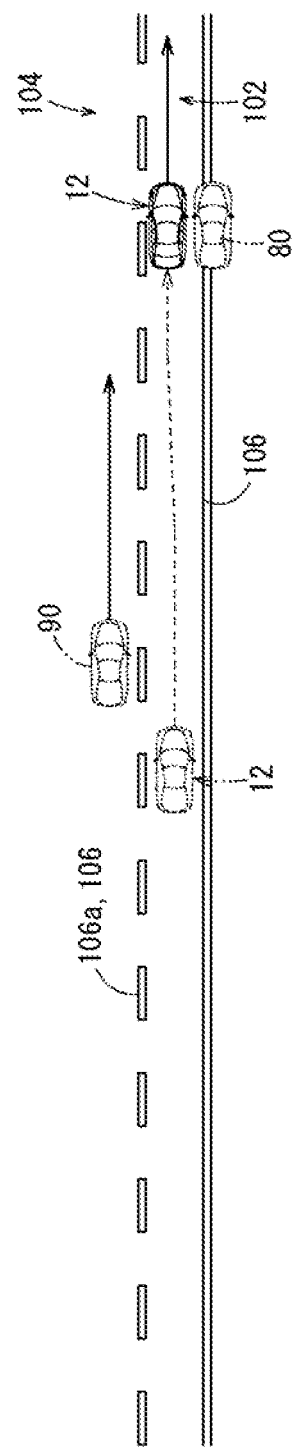

TRAVEL CONTROL DEVICE

CROSS REFERENCES TO RELATED APPLICATIONS

The present application claims priority under 35 U.S.C. § 119 to Japanese Patent Application No. 2016-111949, filed Jun. 3, 2016, entitled "Travel Control Device." The contents of this application are incorporated herein by reference in their entirety.

TECHNICAL FIELD

The present disclosure relates to a travel control device that controls vehicle travel to avoid contact with an obstacle.

BACKGROUND

While controlling travel of a vehicle (vehicle itself), a travel control unit implements contact avoidance to avoid contact when an obstacle (for example, another vehicle that is stopped or decelerating) is present ahead in a travel lane that the vehicle itself is traveling in (for example, see FIG. 10 of Japanese Unexamined Patent Application Publication No. 2010-211299). Examples of control content of the contact avoidance include lane-change control that moves the vehicle itself into an adjacent travel lane, and deceleration control that decelerates the speed of the vehicle itself.

SUMMARY

However, conventional travel control units do not recognize the detailed state of the obstacle or travel lane, and selection options for the control content are therefore narrow, and smooth vehicle travel is prevented in some cases. For example, when an obstacle is present in front of the vehicle itself and another vehicle is traveling in a lane-change target travel lane, conventional travel control units prohibit the lane change and perform deceleration control in the current travel lane.

A driving assistance device described by Japanese Unexamined Patent Application Publication No. 2010-211299 is configured to adjust output of driving assistance information based on operation amounts in similar situations. However, in the case of this configuration, it is not always possible to reliably avoid obstacles since the vehicle itself after output adjustment simply continues to travel. Alternatively, although contact is not made with the obstacle, emergency braking can ultimately result since the vehicle itself comes close the obstacle.

The present disclosure is related to technology for controlling travel of a vehicle, and describes, for example, a travel control unit enabling a vehicle to travel more smoothly by determining in detail and with high precision whether or not a situation allows the vehicle to safely travel.

The present disclosure describes, for example, a travel control unit that includes an acquisition section and a travel control section. The acquisition section is configured to acquire, as surroundings information while a vehicle itself is traveling, at least information regarding an obstacle ahead in a traveling direction and information regarding a width direction side edge of a lane of travel in which the vehicle itself is traveling. The travel control section is configured to compute from the information acquired by the acquisition section a separation between the obstacle and the width direction side edge, and to control travel of the vehicle itself based on the separation.

According to the above, the travel control unit enables the vehicle to travel more smoothly since the travel control unit computes the separation between the obstacle and the width direction edge and controls the vehicle itself based on the separation. Namely, by recognizing, as the surroundings information of the vehicle itself, detailed information regarding the obstacle and the width direction edge of the travel lane, the travel control unit can determine in detail and with high precision whether or not the situation allows the vehicle itself to travel safely. Thus, for example, when the separation is wider than the width of the vehicle itself, the vehicle itself can be guided so as to pass by the side of the obstacle while maintaining the same travel lane. Moreover, when the separation is less than the width of the vehicle itself, the vehicle itself can be guided so as to enter the adjacent lane and avoid the obstacle.

In such cases, the travel control section preferably includes a pass-through control section configured to implement control content to guide the vehicle itself so as to pass through between the obstacle and the width direction side edge when a width of the vehicle itself is narrower than the separation by a predetermined amount or greater.

Thus, including the pass-through control section enables the travel control section to cause the vehicle itself to travel so as to pass through between the obstacle and the width direction edge without significantly distorting the travel path of the vehicle itself. Moreover, hindering the other vehicle traveling in an adjacent lane or the like can be suppressed, and this can contribute to smooth operation on the travel path overall.

In addition to this configuration, the travel control section may include a side-by-side travel avoidance control section configured such that when, based on the information, another vehicle is detected traveling behind the vehicle itself in an adjacent lane adjacent to the travel lane in which the vehicle itself is traveling with a possibility of a state of side-by-side travel with the other vehicle arising at the timing of the vehicle itself reaching the obstacle, the side-by-side travel avoidance control section controls to accelerate or decelerate the vehicle itself so as to avoid side-by-side travel with the other vehicle.

Thus, including the side-by-side travel avoidance control section enables the travel control section to avoid having the vehicle itself travel side-by-side at the position by the side of the obstacle at the same time as the other vehicle. Accordingly, this enables the users of the vehicle itself and the other vehicle to travel on the travel path more comfortably.

Moreover, the travel control section may include a give-way determination control section configured such that when, based on the information, another vehicle is detected traveling behind the vehicle itself in an adjacent lane adjacent to the travel lane in which the vehicle itself is traveling and behavior indicating the other vehicle permits the vehicle itself to enter into the adjacent lane is determined, the give-way determination control section controls to move the vehicle itself into the adjacent lane or to move the vehicle itself onto the width direction side edge.

Thus, including the give-way determination control section enables the travel control section to cause the vehicle itself to easily enter the adjacent lane and avoid obstacles when the other vehicle has permitted the vehicle itself to enter the adjacent lane.

Moreover, the travel control section may include an accelerated lane-change control section configured such that when, based on the information, another vehicle is detected traveling behind the vehicle itself in an adjacent lane adjacent to the travel lane in which the vehicle itself is traveling and a time until the other vehicle reaches the vehicle itself is longer than a predetermined threshold value, the accelerated lane-change control section controls to accelerate the vehicle itself and move the vehicle itself into the adjacent lane.

Thus, including the accelerated lane-change control section enables the travel control section to cause the vehicle itself to accelerate and change lanes into the adjacent lane sufficiently far ahead of the other vehicle.

Moreover, the travel control section may include an overtake lane-change control section configured such that when, based on the information, another vehicle is detected traveling behind the vehicle itself in an adjacent lane adjacent to the travel lane in which the vehicle itself is traveling and a time until the other vehicle reaches the vehicle itself is shorter than a predetermined threshold value, the overtake lane-change control section controls to decelerate the vehicle itself and to move the vehicle itself into the adjacent lane after allowing the other vehicle to overtake.

Thus, when the other vehicle is drawing close to the vehicle itself, including the overtake lane-change control section enables the travel control section to guide the vehicle itself to the adjacent lane after allowing the other vehicle to overtake. This enables contact with obstacles and other vehicles to be avoided even more safely.

Here, the travel control section preferably includes a control determination section that includes plural control content and that is configured to select one item of control content from out of the plural control content based on a state of the vehicle itself, the travel lane, and the obstacle.

Using the control determination section, the travel control section can select appropriate control content from out of the plural items of control content and control the vehicle itself so as to avoid obstacles.

According to the present disclosure, for example, a travel control unit can cause a vehicle to travel more smoothly by determining in detail and with high precision whether or not a situation allows the vehicle to safely travel.

BRIEF DESCRIPTION OF THE DRAWINGS

The advantages of the disclosure will become apparent in the following description taken in conjunction with the following drawings.

FIG. 3A is a first plan view to explain avoiding contact between a vehicle itself and a first other vehicle by lane-change control.

FIG. 3B is a second plan view to explain avoiding contact between a vehicle itself and a first other vehicle by lane-change control.

FIG. 5A is a first plan view to explain avoiding contact between a vehicle itself and first and second other vehicles by accelerated lane-change control.

FIG. 5B is a second plan view to explain avoiding contact between a vehicle itself and first and second other vehicles by accelerated lane-change control.

FIG. 7A is a first plan view to explain avoiding contact between a vehicle itself and first and second other vehicles by pass-through control.

FIG. 7B is a second plan view to explain avoiding contact between a vehicle itself and first and second other vehicles by pass-through control.

DETAILED DESCRIPTION

Detailed explanation follows regarding a preferred embodiment for a travel control unit according to the present disclosure, with reference to the appended drawings.

Figure 1:
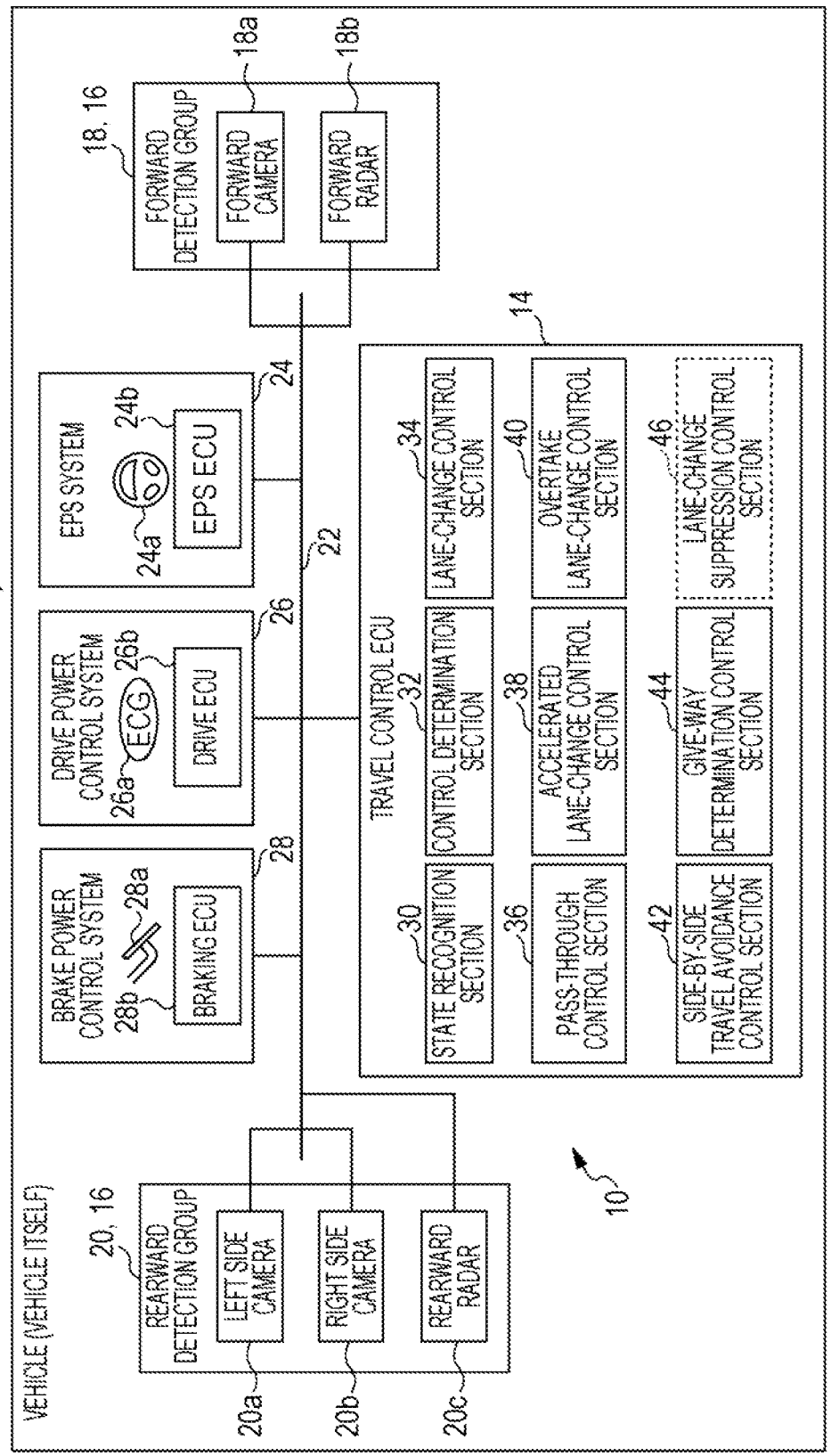
FIG. 1 is a block diagram illustrating an overall configuration of a vehicle itself installed with a travel control unit according to an embodiment of the present disclosure.

A travel control unit 10 according to one embodiment of the present disclosure is installed in a vehicle 12 (also referred to as the vehicle itself 12 hereafter) of a user (driver) as illustrated in FIG. 1, and is configured as a system that controls travel of the vehicle itself 12. In particular, the travel control unit 10 acquires surroundings information for the vehicle itself 12 when the vehicle itself 12 is traveling, and performs control to cause the vehicle itself 12 to travel smoothly while avoiding contact between the vehicle itself 12 and obstacles. Note that hereafter, although explanation is given regarding an example of a four wheeled automobile as the vehicle mounted with the travel control unit 10, the vehicle applied with the travel control unit 10 is obviously not particularly limited.

Overall Configuration of Vehicle Itself 12

The travel control unit 10 includes a travel control ECU 14 that is a main section of a system that performs processing during travel of the vehicle itself 12 (travel control electronic control unit: travel control section), and further includes an acquisition section 16 that acquires surroundings information for the vehicle itself 12. The acquisition section 16 includes, for example, a forward detection group 18 that detects information for ahead of the vehicle itself 12, and a rearward detection group 20 that detects information for behind the vehicle itself 12. The forward detection group 18 and the rearward detection group 20 can be obtained by appropriate use of cameras, sensors, radars, and the like that are mounted to the vehicle itself 12 in advance.

More specifically, the forward detection group 18 includes a forward camera 18a and a forward radar 18b, and the rearward detection group 20 includes a left side camera 20a, a right side camera 20b, and a rearward radar 20c. The forward camera 18a, the forward radar 18b, the left side camera 20a, the right side camera 20b, the rearward radar 20c, and the travel control ECU 14 are connected so as to be able to communicate information by a communication line 22 of an onboard network such as CAN or LIN provided inside, the vehicle, itself 12.

The forward camera 18a captures images of ahead of the vehicle itself 12, and outputs image signals based on the captured images to the travel control ECU 14. The forward camera 18a is, for example, disposed on a vehicle width direction central portion of a front section of the vehicle itself 12 (for example, a rearview mirror, a front bumper, or the like). Moreover, although the forward camera 18a is configured by a single camera in the present embodiment, the forward camera 18a may, for example, be configured as a stereo camera by disposing two cameras with left-right symmetry.

The forward radar 18b outputs transmission waves, which are electromagnetic waves (millimeter waves here) to the exterior of the vehicle itself 12, receives reflected waves that are waves out of the transmission waves reflected by detected objects, and outputs a detection signal corresponding to the reflected waves to the travel control ECU 14. The detection signal includes information regarding the distance and direction from the vehicle itself 12 to the detected object. The forward radar 18b is disposed at a front side of the vehicle itself 12 (for example, the front bumper or the front grille).

The left side camera 20a applies a similar camera to that of the forward camera 18a, and outputs to the travel control ECU 14 an image signal based on captured images captured at the left and rear-left of the vehicle body of the vehicle itself 12. The left side camera 20a is, for example, disposed on a left side mirror of the vehicle or on a rear-left portion of the vehicle body. Similarly, the right side camera 20b outputs to the travel control ECU 14 an image signal based on captured images captured at the right and rear-right of the vehicle body of the vehicle itself 12. The right side camera 20b is, for example, disposed on a right side mirror of the vehicle or on a rear-right portion of the vehicle body.

The rearward radar 20c employs a radar similar to that of the forward radar 18b, and outputs to the travel control ECU 14 a detection signal corresponding to the reflected waves. The rearward radar 20c is, for example, disposed on a vehicle width direction central portion of a rear portion (for example, a rear bumper, a rear gate, or the like) of the vehicle itself 12. Note that the travel control unit 10 may, for example, employ a single radar having a 360° detection range (provided on the roof, for example), and a single radar may serve as the forward radar 18b and the rearward radar 20c. Simply put, the acquisition section 16 that acquires the surroundings information regarding vehicle itself 12 (the forward detection group 18 and the rear-ward detection group 20) can employ various configurations. For example, the acquisition section 16 may employ radars (a left side radar and a right side radar) instead of the left side, camera 20a and the right side camera 20b. Alternatively, a left side detector combining the left side camera 20a with a left side radar, and a right side detector combining the right side camera 20b with a right side radar may be employed.

The travel control ECU 14 is configured by a computer (micro controllers included) including an input/output interface, a processor, and memory (none of which are illustrated in the drawings) as hardware. A processor of the travel control ECU 14 reads a travel control program stored in memory, not illustrated, and executes processing such that the travel control ECU 14 constructs a functional section for controlling and performs traveling control. Detailed explanation regarding specific content of the control processing according to the present embodiment is given later.

Here, the travel control ECU 14 controls travel of the vehicle itself 12 by outputting drive instructions to each system installed in the vehicle itself 12 while the vehicle itself 12 is traveling. Systems of the vehicle itself 12 to which the travel control ECU 14 outputs a drive instruction include, for example, an electric power steering system 24 (referred to as the EPS system 24 hereafter), a drive power control system 26, and a brake power control system 28. The travel control unit 10, the EPS system 24, the drive power control system 26, and the brake power control system 28 are connected to one another through the communication line 22 of the vehicle itself 12.

The EPS system 24 includes a steering wheel 24a, an EPS ECU 24b (an EPS electronic control unit), and the like. Moreover, the EPS ECU 24b implements steering control on the steering wheel 24a by appropriately operating each configuration element of the EPS system 24. Other than steering assistance control that reduces the steering power of the user on the steering wheel 24a, examples of the steering control include automatic steering control that controls the travel direction of the vehicle itself 12 when the vehicle itself 12 is autonomously traveling.

The drive power control system 26 includes an engine 26a (a drive source), a drive ECU 26b (a drive electronic control unit), and the like. The drive ECU 26b controls drive power of the vehicle itself 12 by appropriately operating each configuration element of the drive power control system 26, which includes the engine 26a. Examples of drive power control include automatic cruise control that causes the vehicle itself 12 to travel such that the vehicle speed Ve [km/h] matches a target vehicle speed, and automatic vehicle speed control that accelerates or adjusts the vehicle speed of the vehicle itself 12 when the vehicle itself 12 is traveling autonomously.

The brake power control system 28 includes a brake mechanism 28a, a braking ECU 28b (a braking electronic control unit), and the like. The braking ECU 28b controls braking power of the vehicle itself 12 by appropriately operating each configuration element of the brake power control system 28, which includes the brake mechanism 28a. Other than manual deceleration control that generates braking power based on operation of a foot brake by a user, examples of brake power control include automated deceleration control that autonomously generates braking power based on detection by the acquisition section 16 or the like (known as automated braking).

Control by Travel Control Unit 10

In the travel control unit 10, the user selects whether travel control of the vehicle itself 12 is entrusted to the travel control unit 10, or the user drives manually. Then, in cases in which travel control of the vehicle itself 12 is entrusted to the travel control unit 10 in a situation in which no obstacles are detected, the EPS system 24 is controlled using a lane keeping control section, not illustrated in the drawings, and implements lane keeping control that causes the vehicle itself 12 to travel along a travel lane.

Figure 2:
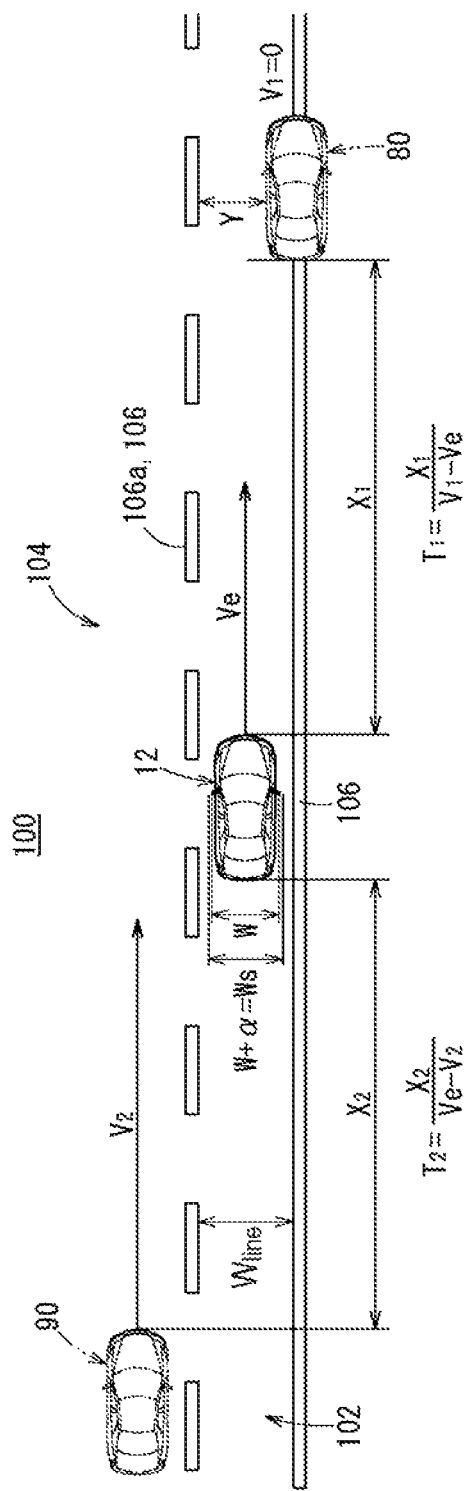
FIG. 2 is a plan view explaining parameters for control by the travel control unit in FIG. 1.

Note that in the explanation below, a road having right-hand traffic as illustrated in FIG. 2 is given as an example of a travel path 100 on which the vehicle itself 12 travels. Obviously, the travel control unit 10 can perform similar control in left-hand traffic. Moreover, in the present embodiment, representative explanation is given regarding a travel path 100 having two-vehicle lanes per side with the two travel lanes extending parallel to each other. Hereafter, the travel lane on the right side of the right-hand traffic is referred to as a first lane 102, and the adjacent lane on the left of the first lane 102 is referred to as a second lane 104. Moreover, the width direction edges of the first and second lanes 102 and 104 are demarcated by lane markings 106, and lane markings 106a between the first lane 102 and the second lane 104 (width direction edges) are boundary lines indicating that overtaking is allowed.

For example, in lane keeping control, the travel control ECU 14 computes the width of the first lane 102 from the lane markings 106 at either side based on the image information from the forward camera 18a, and steers the steering wheel 24a of the EPS system 24 such that the vehicle itself 12 travels along a width direction central portion of the first lane 102. Moreover, in the lane keeping control, the travel control ECU 14 may output an operation instruction to the drive power control system 26 or the brake power control system 28 to adjust the vehicle speed of the vehicle itself 12 based on a non-illustrated vehicle traveling ahead, speed limits on the road, or the like, thereby implementing automated cruise control.

Then, in a situation in which an obstacle is present ahead in the travel direction of the travel lane in which the vehicle itself 12 is traveling, the travel control unit 10 controls so as to avoid contact (a collision) with the obstacle. For example, when the vehicle itself 12 is traveling in the first lane 102, another vehicle parked in the first lane 102 so as to stick out (referred to as the first other vehicle 80 hereafter) can be considered an obstacle that influences travel of the vehicle itself 12. Moreover, when the vehicle itself 12 changes travel lanes from the first lane 102 toward the second lane 104 (a lane change), another vehicle traveling somewhat behind the vehicle itself 12 in the second lane 104 (referred to as the second other vehicle 90 hereafter) can be considered an obstacle that influences travel of the vehicle itself 12. Note that obstacles are not limited to vehicles such as the first and second other vehicles 80 and 90. For example, vehicles traveling in front of the vehicle itself 12 may be obstacles depending on the situation. Further examples of other obstacles that influence traveling of the vehicle itself 12 include humans and other animals, objects, and construction sites.

In accordance with operation by the user to entrust change of travel lane to the travel control unit 10 (namely, start of lane-change control), the travel control ECU 14 controls the vehicle itself 12 so as to automatically avoid obstacles. The trigger that starts the automatic lane-change control is not particularly limited; however, examples thereof include operation of a non-illustrated turn signal by the user in a specific direction (a direction of movement toward the second lane 104).

In order to avoid obstacles, the travel control ECU 14 recognizes the presence or absence of the first and second other vehicles 80 and 90, and the first lane 102, by using the acquisition section 16 to acquire information regarding the front and rear of the vehicle itself 12. In particular, the travel control ECU 14 according to the present embodiment is provided with a state recognition section 30 that analyzes (recognizes) the state of the first and the second other vehicles 80 and 90 and the state of the first lane 102 in detail when the first other vehicle 80 or the second other vehicle 90 has been detected.

While traveling, the state recognition section 30 acquires the vehicle speed Ve of the vehicle itself 12 from the drive power control system 26, a speedometer, or the like, and ascertains the travel state of the vehicle itself 12. Moreover, the state recognition section 30 reads a left-right width W of an outmost protruding portion of the vehicle itself 12 (for example, between the left side mirror and the right side mirror) pre-stored in memory of the travel control ECU 14.

Then the state recognition section 30 performs image processing on the image information transmitted from the forward detection group 18, extracts each of the lane markings 106 of the first other vehicle 80 and the first and second lanes 102 and 104, and computes the width $W_{line}$ of the first lane 102 based on the extracted lane markings 106 of the first lane 102. Moreover, the state recognition section 30 computes a distance $X_1$ from the vehicle itself 12 to the first other vehicle 80 based on the detection signal from the forward radar 13b. This enables a vehicle speed $V_1$ of the first other vehicle 80 to be computed (when in a stopped state, $V_1=0$) based on changes in the distance $X_1$ and the vehicle speed Ve of the vehicle itself 12. In addition, the state recognition section 30 computes a separation Y between the first other vehicle 80 and the lane markings 106a at the position where the first other vehicle 80 is stopped based on an extracted position of the left side face of the first other vehicle 80 and the position of the lane markings 106a (boundary lines).

Moreover, the state recognition section 30 performs image processing on the image information transmitted from the rearward detection group 20, extracts the lane marking 106 of the second other vehicle 90 and the first and second lanes 102 and 104, and computes the distance $X_2$ and direction from the vehicle itself 12 to the second other vehicle 90 based on the detection signal of the rearward detection group 20 (for example, the rearward radar 20c). This enables the vehicle speed $V_2$ of the second other vehicle 90 to be computed based on changes in the distance $X_2$ and the vehicle speed Ve of the vehicle itself 12. Note that the state recognition section 30 does not only recognize travel lanes using the lane markings 106, travel lanes may be recognized from various objects (such as curbs, fences, road side strips, and median strips) that may serve as a width direction edge. Alternatively, in cases in which the lane markings 106 cannot be extracted, the state recognition section 30 may envisage a hypothetical travel lane (width direction edge) of the vehicle itself 12 based on the overall width of the travel path 100 or the like.

Returning to FIG. 1, the travel control ECU 14 includes a control determination section 32 that determines and selects content of travel control of the vehicle itself 12 using each of the parameters described above recognized by the state recognition section 30. The control determination section 32 determines the content of control performed by the vehicle itself 12 by estimating the position and operation on a time axis of travel of the vehicle itself 12. Thus, as illustrated in FIG. 2, the control determination section 32 computes a first time $T_1$ at which the vehicle itself 12 will reach the first other vehicle 80 based on the vehicle speed Ve and distance X of the vehicle itself 12, and computes a second time $T_2$ at which the second other vehicle 90 will reach the vehicle itself 12 based on the vehicle speed Ve of the vehicle itself 12 and the vehicle speed $V_2$ and distance $X_2$ of the other vehicle. Moreover, the control determination section 32 is configured to determine whether or not the vehicle itself 12 is able to travel in the first lane 102 by comparing a safe width $W_s$, which is a safety margin α added to the left-right width W of the vehicle itself 12, against a separation Y between the first other vehicle 80 and the lane markings 106.

Hereafter, specific explanation regarding specific content of control by the travel control unit 10 follows, divided into cases in which the first other vehicle 80 is present but the second other vehicle 90 is not present (also referred to as Pattern A hereafter) and cases in which the first other vehicle 80 is present and the second other vehicle 90 is also present (also referred to as Pattern B hereafter).

A. Case in which First Other Vehicle 80 is Present but Second Other Vehicle 90 is not Present The travel control unit 10 detects the first other vehicle 80 ahead in the first lane 102 in which the vehicle itself 12 is traveling, within the detection range of the forward detection group 18. On the one hand, Pattern A is recognized in cases in which the travel control unit 10 did not detect the second other vehicle 90 in the detection range of the second lane 104 at the timing at which the first other vehicle 80 was detected, and in cases in which the second other vehicle 90 was detected but the second time $T_2$ was longer than a threshold value of the control determination section 32 (referred to as the first threshold value Th1 hereafter, to distinguish from another threshold value described later). The first threshold value Th1 is a value that determines timings at which lane-change control or pass-through control can be implemented, and is, for example, set based on the first time $T_1$.

When the Pattern A is recognized, the control determination section 32 selects either lane-change control that causes the vehicle itself 12 to move from the first-lane 102 to the second lane 104, or pass-through control that causes the vehicle itself 12 to pass by the side of the first other vehicle 80 while remaining in the first lane 102, thereby avoiding contact with the first other vehicle 80. In this case, the control determination section 32 implements lane-change control in cases in which the safe width $W_s$>the separation Y when comparing the safe width $W_s$ (=W+α) described above against the separation Y between the first other vehicle 80 and the lane markings 106, and implements pass-through control in cases in which the safe width $W_s$≤the separation Y.

A-a. Lane-Change Control

The control determination section 32 selects lane-change control when it has been determined that the first other vehicle 80 is sticking out significantly into the first lane 102 as illustrated in FIG. 3A and that the vehicle itself 12 will contact the first other vehicle 80 even when traveling in the first lane 102 as-is. The travel control ECU 14 accordingly causes the lane-change control section 34 to operate such that the vehicle itself 12 changes travel lane and travels. Note that a notification of the lane change for avoiding the obstacle may be issued via a non-illustrated display section or speaker of the vehicle itself 12 when implementing lane-change control.

The lane-change control section 34 is a functional section that implements automated lane-change control. The lane-change control section 34 generates a target course for the vehicle itself 12 based on the image information detected by the forward camera 18a and the detection signal detected by the forward radar 18b. Then, the lane-change control section 34 causes the EPS system 24, the drive power control system 26, and the brake power control system 28 to operate such that the vehicle itself 12 moves along the generated target course. As illustrated in FIG. 3B, the vehicle itself 12 thereby steers to cross over the lane markings 106a while traveling an appropriate vehicle speed, and moves into the second lane 104 before reaching the first other vehicle 80. As a result, contact between the vehicle itself 12 and the first other vehicle 80 can be avoided.

Note that when no obstacles are present within a predetermined distance after the vehicle itself 12 has moved further forward than the first other vehicle 80, the lane-change control section 34 may implement lane-change control to move the vehicle itself 12 from the second lane 104 into the first lane 102. Moreover, rather than simply moving the vehicle itself 12 as a whole completely into the second lane 104 during the lane change, the lane-change control section 34 may cause travel such that only a portion of the vehicle enters the second lane 104, based on the safe width $W_s$ between the position of the first other vehicle 80 and the vehicle itself 12. Namely, lane marking travel control in which the vehicle itself 12 travels while straddling the lane markings 106a to avoid contact with the first other vehicle 80. This enables the vehicle, itself 12 to satisfactorily pass by the side of the first other vehicle 80 without swerving significantly out from the center of the road into the oncoming lane, even when there is, for example, one-lane per side.

A-b. Pass-Through Control

Figure 4A:
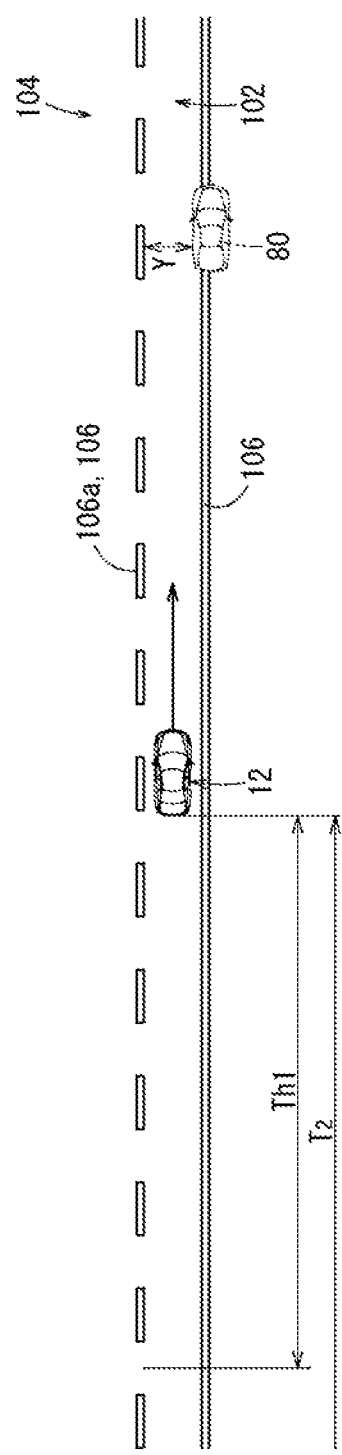
FIG. 4A is a first plan view to explain avoiding contact between a vehicle itself and a first other vehicle by pass-through control.

The control determination section 32 selects pass-through control when it has been determined that the first other vehicle 80 is barely sticking out into the first lane 102 as illustrated in FIG. 4A and that the vehicle itself 12 can avoid contact with the first other vehicle 80 even when traveling in the first lane 102 as-is. In such cases, the travel control ECU 14 causes the pass-through control section 36 to operate to implement, pass-through control. Note that, obviously, lane-change control can be implemented even when Y≥Ws. For example, even when pass-through control was determined, the travel control ECU 14 may cause the lane-change control section 34 to operate based on the user steering the steering wheel 24a toward the second lane 104.

Figure 4B:
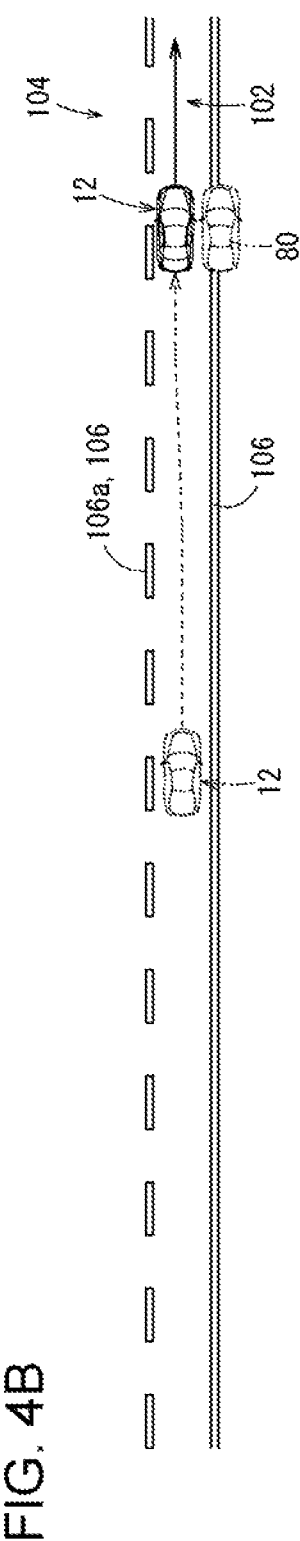
FIG. 4B is a second plan view to explain avoiding contact between a vehicle itself and a first other vehicle by pass-through control.

The pass-through control section 36 causes the vehicle itself 12 to operate so as to pass by the side of the first other vehicle 80 while traveling in the first lane 102, based on there being sufficient width between the first other, vehicle 80 and the lane markings 106a. For example, the pass-through control section 36 generates a target course such that a width direction central portion of the computed safe width $W_s$ aligns with a width direction central point of the separation Y. The pass-through control section 36 then causes the EPS system 24, the drive power control system 26, and the brake power control system 28 to operate such that the vehicle itself 12 moves along the target course. As illustrated in FIG. 4B, the vehicle itself 12 thereby operates so as to draw somewhat nearer to the second lane 104 while inside the first lane 102.

Moreover, when no obstacles are present within a predetermined distance after the vehicle itself 12 has passed the first other vehicle 80, the pass-through control section 36 may restore the direction of travel of the vehicle itself 12 so that the vehicle itself 12 draws near to a width direction central portion of the first lane 102. In such cases, the vehicle itself 12 can, for example, detect that the first other vehicle 80 has been passed based on detection of the first other vehicle 80 by the rearward detection group 20 (the right side camera 20b).

Note that pass-through control performs control to pass by the side of the first other vehicle 80 while maintaining the safe width $W_s$ of the vehicle itself 12, with the objective of avoiding contact with the first other vehicle 80. Accordingly, if the safe width $W_s$≤the separation Y, the travel control ECU 14 may perform pass-through control irrespective of whether the second other vehicle 90 is present. In other words, the travel control unit 10 may appropriately implement the pass-through control without recognition or determination of Pattern A or Pattern B described above.

Moreover, in the pass-through control when the safe width $W_s$≤the separation Y, other than generating the target course, the pass-through control section 36 may guide the vehicle itself 12 while maintaining the safe width $W_s$ of the vehicle itself 12 (namely, while monitoring to ensure the edge of the safe width $W_s$ does not contact the first other vehicle 80). This makes it possible to satisfactorily pass by the side of the first other vehicle 80.

B. Cases in Which the First Other Vehicle 80 is Present and the Second Other Vehicle 90 is also Present The travel control unit 10 detects the first other vehicle 80 ahead in the first lane 102 in which the vehicle itself 12 is traveling, within the detection range of the forward detection group 18. Moreover, the travel control unit 10 recognizes the Pattern B when, at the timing at which the first other vehicle 80 was detected, the second other vehicle 90 is detected within the detection range of the second lane 104 with the second time $T_2$ that is shorter than the first threshold value Th1 described above. When the Pattern B is recognized, the travel control ECU 14 performs control so as to avoid contact with the first other vehicle 80 present ahead of the vehicle itself 12 and the second other vehicle 90 present behind the vehicle itself 12 by appropriate travel.

In such cases, the control determination section 32 selects control from out of plural control contents based on the computed first and second times $T_1$ and $T_2$, and a determination result indicating whether travel in the first lane 102 is permissible. Examples of specific control content include (a) accelerated lane-change control, (b) overtake lane-change control, (c) pass-through control, (d) side-by-side travel avoidance control, and (e) give-way determination control. Explanation follows regarding determination content of the control determination section 32 and each control content.

B-a. Accelerated Lane-Change Control

The accelerated lane-change control is control that causes the vehicle itself 12 to change lanes into the second lane 104 ahead of the second other vehicle 90 by accelerating the vehicle itself 12. As illustrated in FIG. 1, the travel control ECU 14 includes an accelerated lane-change control section 38 for determining that the accelerated lane-change control is to be implemented. The control, determination section 32 drives the accelerated lane-change control section 38 when it is supposed that the vehicle itself 12 will reach the first other vehicle 80 sufficiently earlier than the second other vehicle 90 will reach the first other vehicle 80, and that the safe width $W_s$ described above>the separation Y.

The control determination section 32 accordingly sets a value of a second threshold value Th2 that is lower than the first threshold value Th1, and compares the second threshold value Th2 against the second time $T_2$. The second threshold value Th2 is a value for determining whether or not the vehicle itself 12 can change to the second lane 104 while further ahead than the second other vehicle 30 by accelerating the vehicle itself 12.

The control determination section 32 can estimate whether a long time will be taken for the second other vehicle 90 to reach the first other vehicle 80 when the second time $T_2 \geq$ the second threshold value Th2. For example, when the current vehicle speed Ve of the vehicle itself 12 is high and the vehicle speed $V_2$ of the second other vehicle 90 is low, the vehicle itself 12 has ample time to accelerate. Moreover, when the safe width $W_s$>the separation Y, it is determined that moving to the second lane 104 is necessary since the vehicle itself 12 would make contact with the first other vehicle 80 if the vehicle itself 12 were to travel in the first lane 102 as-is.

As illustrated in FIG. 5A, when driving of the accelerated lane-change control section 38 has started, the accelerated lane-change control section 38 generates the target course of the vehicle itself 12 and computes the target vehicle speed of the vehicle itself 12 on the target-course for each predetermined time. Control that accelerates the vehicle itself 12 is included in the target vehicle speed. Then, the accelerated lane-change control section 38 controls the EPS system 24 so that the vehicle itself 12 moves along the target course, and operates the drive power control system 26 and the brake power control system 28 so as to match the target vehicle speed.

As illustrated in FIG. 5B, the vehicle itself 12 thereby accelerates away from the second other vehicle 90 in the first lane 102 and moves into the second lane 104 before reaching the first other vehicle 80 by steering so as to cross over the lane markings 106a. As a result, the vehicle itself 12 can avoid contact with the first and second other vehicles 80 and 90.

B-b. Overtake Lane-Change Control

Overtake lane-change control is control that causes the vehicle itself 12 to decelerate and change lanes into the second lane 104 after the vehicle itself 12 been overtaken by the second other vehicle 90. As illustrated in FIG. 1, the travel control ECU 14 includes an overtake lane-change control section 40 for implementing the overtake lane-change control.

The control determination section 32 drives the overtake lane-change control section 40 when the vehicle itself 12 is unable to reach the first other vehicle 80 quickly enough to reach the first other vehicle 80 before the second other vehicle 90 (when the second time $T_2$<the second threshold value Th2) and the safe width $W_s$>the separation Y. For example, when the current vehicle speed Ve of the vehicle itself 12 is low and the vehicle speed $V_2$ of the second other vehicle 90 is high, the vehicle itself 12 would possibly draw close and make contact with the second other vehicle 90 if the vehicle itself 12 were to change lanes as-is. Therefore, smoother travel results from changing lanes after the second other vehicle 90 has gone by.

Figure 6A:
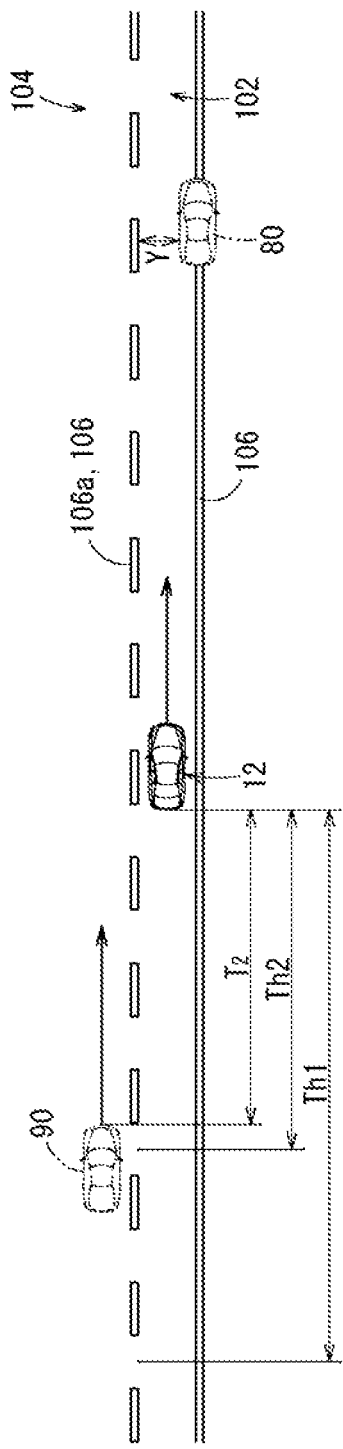
FIG. 6A is a first, plan view to explain avoiding contact between a vehicle itself and first and second other vehicles by overtake lane-change control.

As illustrated in FIG. 6A, when driving of the overtake lane-change control section 40 has started, the overtake lane-change control section 40 generates the target course of the vehicle itself 12 and computes the target vehicle speed of the vehicle itself 12 on the target course for each predetermined time. Control that decelerates the vehicle itself 12 is included in the target vehicle speed. Then, the overtake lane-change control section 40 controls the EPS system 24 so that the vehicle itself 12 moves along the target course and operates the drive power control system 26 and the brake power control system 28 to match the target vehicle speed.

Figure 6B:
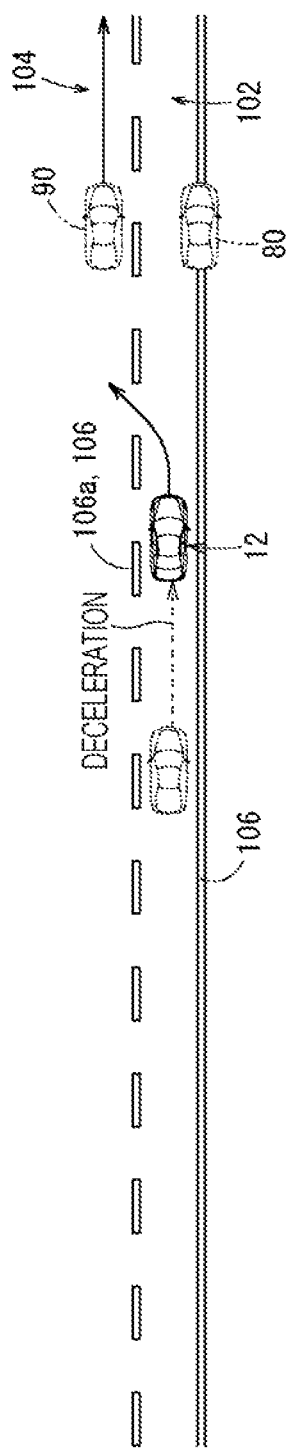
FIG. 6B is a second plan view to explain avoiding contact between a vehicle itself and first and second other vehicles by overtake lane-change control.

Accordingly, as illustrated in FIG. 6B the vehicle itself 12 decelerates in the first lane 102, is overtaken by the second other vehicle 90, and then moves into the second lane 104 before reaching the first other vehicle 80 by steering so as to cross over the lane markings 106a. As a result, the vehicle itself 12 can avoid contact with the first and second other vehicles 80 and 90. Note that the overtake lane-change control section 40 may cause the vehicle itself 12 to react quickly when lane changing by computing target vehicle speeds that gradually decelerate the vehicle itself 12 without causing the vehicle itself 12 to stop completely.

B-c. Pass-Through Control

In the pass-through control, the same control as the pass-through control in Pattern A described above is performed, by the pass-through control section 36 of FIG. 1. Namely, the pass-through control section 36 operates so as to cause the vehicle itself 12 to draw near the lane markings 106a within the first lane 102 and pass by the side of the first other vehicle 80, as illustrated in FIG. 7A and FIG. 7B.

The control determination section 32 drives the pass-through control section 36 when the first time $T_1$ and the second time $T_2$ are sufficiently different and the safe width $W_s \leq$ the separation Y. Here, when the first time TL and the second time $T_2$ are sufficiently different, this is a state in which the second other vehicle 90 will be either further ahead or further behind the vehicle itself 12 or the first other vehicle 80 with sufficient separation therebetween when the vehicle itself 12 reaches the first other vehicle 80. When the second other vehicle 90 is thus sufficiently separated from the vehicle itself 12, contact between the first and second other vehicles 80 and 90 can be safely avoided when the vehicle itself 12 passes by the side of the first other vehicle 80.

B-d. Side-by-side Travel Avoidance Control

Figure 8A:
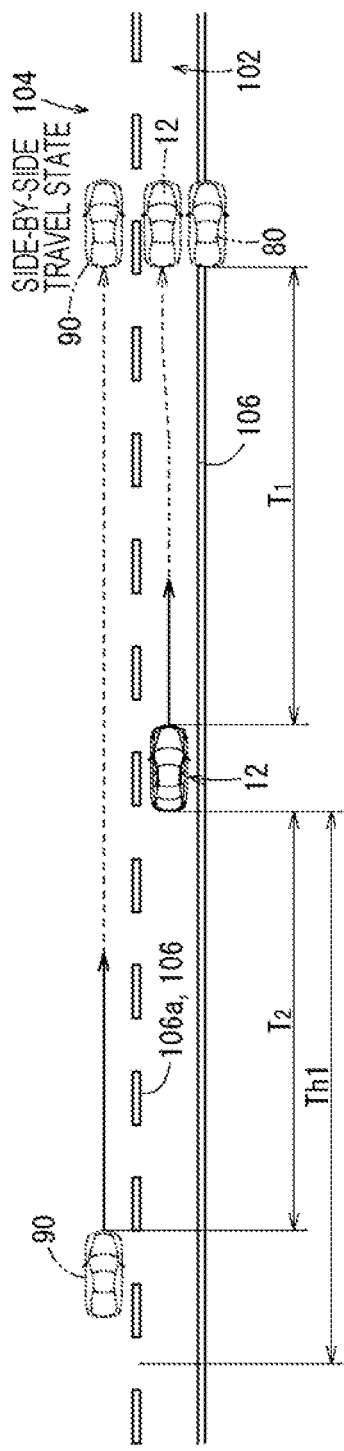
FIG. 8A is a first plan view to explain avoiding contact between a vehicle itself and first and second other vehicles by side-by-side travel avoidance control.

The side-by-side travel avoidance control is control that avoids a state of side-by-side travel with the second other vehicle 90, as illustrated in FIG. 8A, at the timing at which the vehicle itself 12 reaches the first other vehicle 80 when performing the pass-through control described above. As illustrated in FIG. 1, the travel control ECU 14 includes a side-by-side travel avoidance control section 42 for implementing the side-by-side travel avoidance control.

The control determination section 32 drives the side-by-side travel avoidance control section 42 when, conversely to in the pass-through control described above, the first time $T_1$ and the second time $T_2$ barely differ from each other, even if the safe width $W_s \leq$ the separation Y. Note that when the time difference between the first time $T_1$ and the second time $T_2$ is, for example, within a 3 second difference (a predetermined time difference), this is an example of a case in which the first time $T_1$ and the second time $T_2$ barely differ from each other. The vehicle itself 12 will possibly enter a state of side-by-side travel with the second other vehicle 90 when within this predetermined time difference.

Figure 8B:
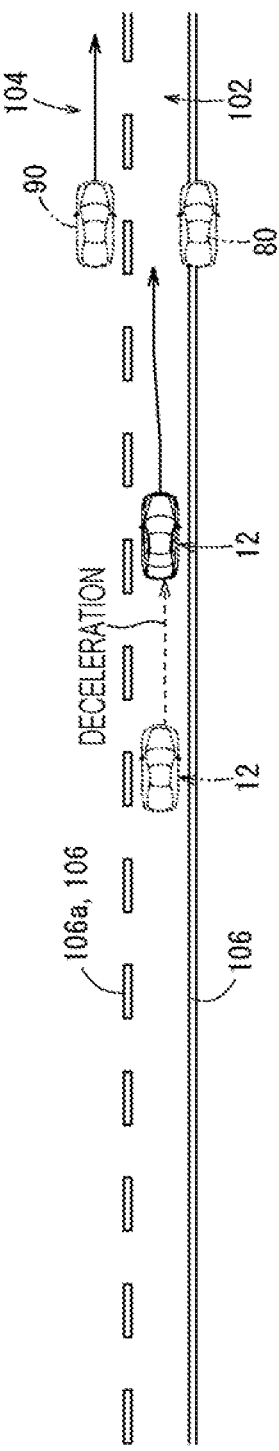
FIG. 8B is a second plan view to explain avoiding contact between a vehicle itself and first and second other vehicles by side-by-side travel avoidance control.

When driving of the side-by-side travel avoidance control section 42 has started, the side-by-side travel avoidance control section 42, for example, calculates the first time $T_1$—the second time $T_2$, and extracts the positive or negative sign of the calculated time. Then, in the case of a positive sign, the vehicle itself 12 draws near the second lane 104 within the first lane 102 while the vehicle itself 12 accelerates, and the vehicle itself 12 passes the first, other vehicle 80 before the second other vehicle 90 passes the first other vehicle 80. In the case of a negative sign, as illustrated in FIG. 8B, the vehicle itself 12 decelerates and allows the second other vehicle Y 90 to overtake, the vehicle itself 12 draws near the second lane 104 within the first lane 102, and the vehicle itself 12 passes the first other vehicle 30 after the second other vehicle 90 has passed the first other vehicle 80. This enables the three vehicles (the vehicle itself 12 and the first and second other vehicles 80 and 90) to avoid lining up side-by-side at the position of the first other vehicle 80, and can cause the vehicle itself 12 to travel more safely and smoothly.

B-e. Give-Way Determination Control

The give-way determination control is control that moves the vehicle itself 12 into the second lane 104 when it has been determined that the second other vehicle 90 permits an operation by the vehicle itself 12 to change lanes to the second lane 104. As illustrated in FIG. 1, the travel control ECU 14 includes a give-way determination control section 44 for implementing the give-way determination control.

Figure 9A:
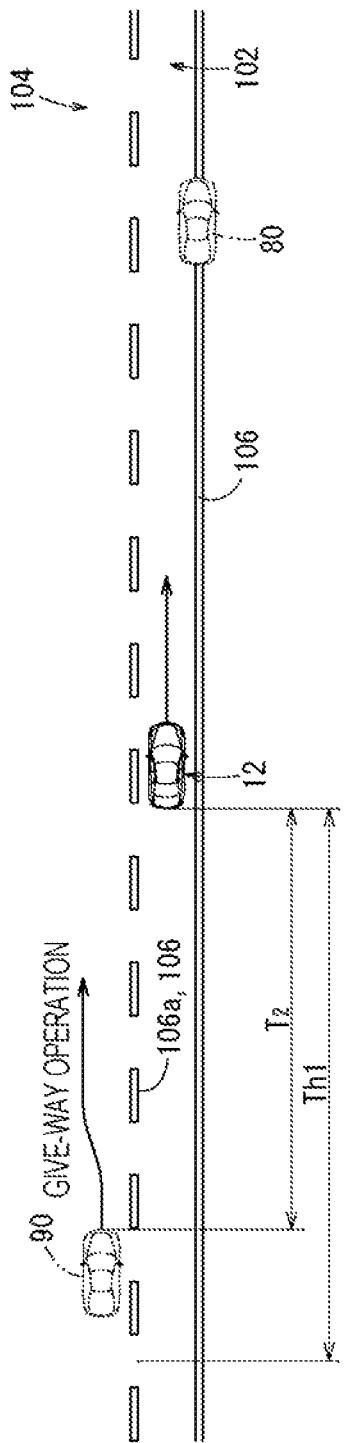
FIG. 9A is a first plan view to explain avoiding contact between a vehicle itself and first and second other vehicles by give-way determination control.

For example, when implementing lane-change control, the give-way determination control section 44 periodically acquires image information and a detection signal from the rearward detection group 20, and monitors the behavior of the second other vehicle 90, then, as illustrated in FIG. 9A, detects operations permitting the vehicle itself 12 to change lanes to the second lane 104, such as the second other vehicle 90 drawing near to the left side of the second lane 104 or the second other vehicle 90 decelerating. In such an event, behavior of the second other vehicle 90 is determined by using analysis of image information to extract, for example, illumination of a brake light or turn signal.

Figure 9B:
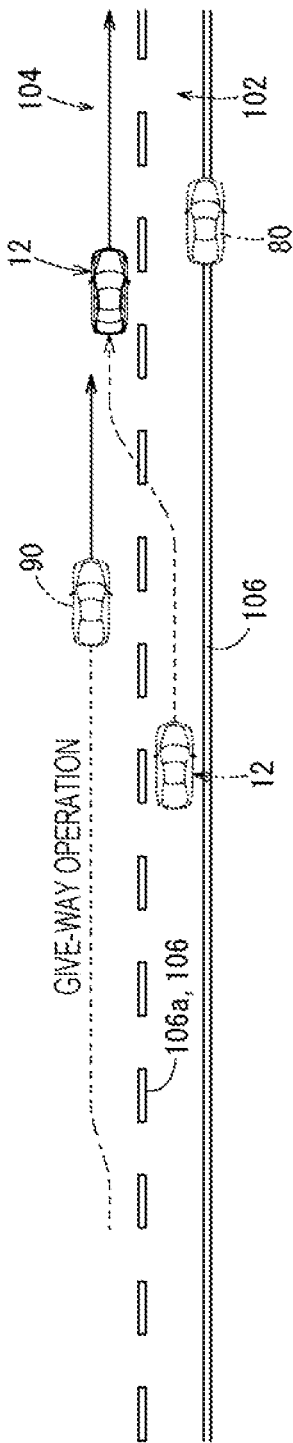
FIG. 9B is a second plan view to explain avoiding contact between a vehicle itself and first and second other vehicles by give-way determination control.

When it has been determined that the second other vehicle 90 has performed an operation permitting the lane change, the give-way determination control section 44 may perform give-way determination control by performing interrupt processing, even when in the midst of implementing a different control. When the interrupt processing has started, the give-way determination control section 44 generates the target course for the vehicle itself 12, similarly to in the lane-change control, and operates the EPS system 24, the drive power control system 26, and the brake power control system 28 along the target course. Accordingly, as illustrated in FIG. 9B, the vehicle itself 12 steers such that the vehicle itself 12 crosses over the lane markings 106a and changes lanes into the second lane 104 ahead of the second other vehicle 90. As a result, contact with the first and second other vehicles 80 and 90 is avoided. Note that in the give-way determination control, configuration may be made such that the lane marking travel control is implemented to cause the vehicle itself 12 to travel on the lane markings 106a by moving into the second lane 104 by just an amount that avoids the second other vehicle 90 in the width direction.

Processing Flow of Travel Control

Figure 10:
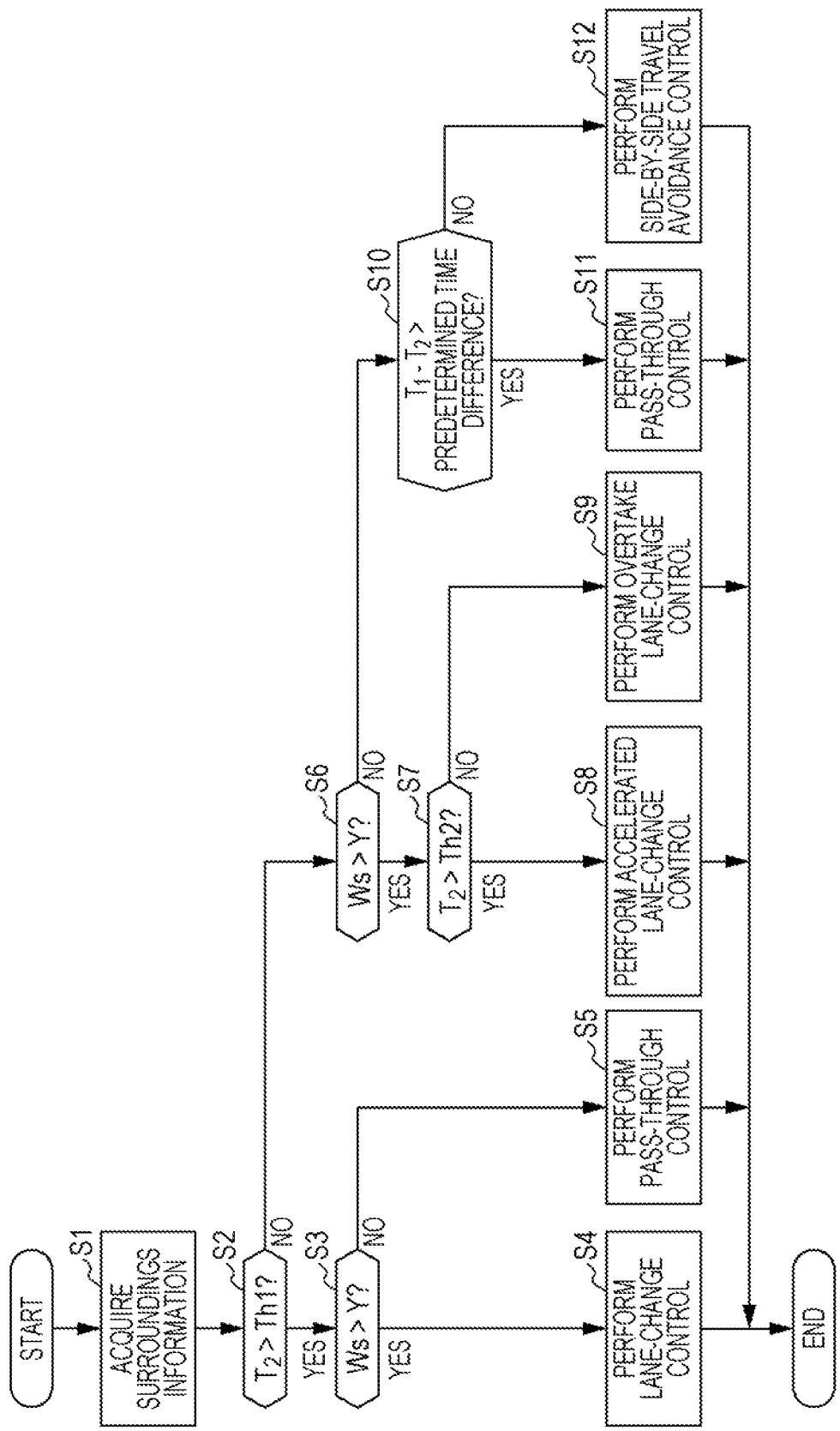
FIG. 10 is a flowchart illustrating an example of a travel control processing flow in the travel control unit of FIG. 1.

The travel control unit 10 according to the present embodiment is basically configured as described above. Explanation follows regarding an example of a travel control method (processing flow) and advantageous effects, with reference to FIG. 10.

The travel control unit 10 operates periodically while the vehicle itself 12 is traveling, and uses the acquisition section 16 to monitor the state of the surroundings (for example, the lane markings 106 of the lane of travel, and other vehicles traveling ahead) through which the vehicle itself 12 is traveling. Moreover, the travel control unit 10 uses the acquisition section 16 to detect obstacles appearing ahead in the first lane 102 in which the vehicle itself 12 is traveling, and the travel control unit 10 also determines whether or not operation causing the vehicle itself 12 to autonomously change lanes, namely, selection of lane change control by a user, has been made. In the present embodiment, a switch-on operation for the lane-change control is performed by the user operating a turn signal (illumination of the turn signal for turning toward the second lane 104).

When it has been determined that a user operation was made, the travel control ECU 14 starts control to avoid obstacles, and first uses the acquisition section 16 to acquire the state of the first lane 102, the state of the first other vehicle 80, and the state of the second other vehicle 90 (including confirming the presence of the vehicle) (step S1). Namely, the distance $X_1$ from the vehicle itself 12 to the first other vehicle 80, the vehicle speed $V_1$ of the first other vehicle 80, the first time $T_1$ until the vehicle itself 12 reaches the first other vehicle 80, the separation Y between the first other vehicle 80 and the lane markings 106a, the presence or absence of the second other vehicle 90, the distance $X_2$ from the vehicle itself 12 to the second other vehicle 90, the vehicle speed $V_2$ of the second other vehicle 90, and the second time $T_2$ until the second other vehicle 90 reaches the vehicle itself 12 are detected and computed (see FIG. 2).

Next, the control determination section 32 determines whether or not the second time $T_2$ is longer than the first threshold value Th1 (step S2), and determines what influence the second other vehicle 90 will have when the vehicle itself 12 changes lanes. At step S2, processing proceeds to step S3 when the second time $T_2$ is longer than the first threshold value Th1, or proceeds to step S6 when the second time $T_2$ is shorter than the first threshold value Th1. Processing also proceeds to step S3 when the second other vehicle 90 is not present.

When the second time $T_2$ is longer than the first threshold, value Th1 and when the second other vehicle 90 is not present, it is sufficient for the vehicle itself 12 avoid only the first other vehicle 80. In order to do so, at step S3, the control determination section 32 compares the safe width $W_s$ of the vehicle itself 12 against the separation Y between the first other vehicle 80 and the lane markings 106a, and determines whether or not the safe width $W_s$ is greater than the separation Y. Processing proceeds to step S4 to implement lane-change control when the safe width $W_s$>the separation Y, or processing proceeds to step S5 to implement the pass-through control when the safe width $W_s \leq$ the separation Y.

At step S4, the lane-change control section 34 of the travel control ECU 14, based on detection by the acquisition section 16, operates the EPS system 24, the drive power control system 26, and the brake power control system 28 to guide the vehicle itself 12 along the second lane 104 (see FIG. 3A and FIG. 3B).

On the other hand, at step S5, based on detection by the acquisition section 16, the pass-through control section 36 of the travel control ECU 14 operates the EPS system 24, the drive power control system 26, and the brake power control system 28 to guide the vehicle itself 12 to pass by the side of the first other vehicle 80 while still traveling in the first lane 102 (see FIG. 4A and FIG. 4B).

Moreover, at step S2, when it has been determined that the second time $T_2$ is shorter than the first threshold value Th1, it is necessary to avoid the first other vehicle 80 and to also avoid the second other vehicle 90. In such cases, at step S6, the control determination section 32 compares the safe width $W_s$ of the vehicle itself 12 against the separation Y between the first other vehicle 80 and the lane markings 106a, and determines whether or not the safe width $W_s$ is greater than the separation Y. Processing proceeds to step S7 when the safe width $W_s$>the separation, or processing proceeds to step S10 when the safe width $W_s \leq$ the separation Y.

Next, at step S7, the control determination section 32 compares the second time $T_2$ against the second threshold value Th2 and determines whether or not the second time $T_2$ is longer than the second threshold value Th2. Processing proceeds to step S8 to implement accelerated lane-change control when the second time $T_2$>the second threshold value Th2, or processing proceeds to step S3 to implement overtake lane-change control when the second time $T_2 \leq$ the second threshold value Th2.

At step S8, based on detection by the acquisition section 16, the accelerated lane-change control section 38 of the travel control ECU 14 operates the EPS system 24, the drive power control system 26, and the brake power control system 28 to guide the vehicle itself 12 to the second lane 104 while accelerating (see FIG. 5A and FIG. 5B).

At step S9, based on detection by the acquisition section 16, the overtake lane-change control section 40 of the travel control ECU 14 operates the EPS system 24, the drive power control system 26, and the brake power control system 28 so that the vehicle itself 12 decelerates and is guided to the second lane 104 after the second other vehicle 90 has passed by (see FIG. 6A and FIG. 6B).

On the other hand, at step S10, the control determination section 32 compares the first time $T_1$ against the second time $T_2$, and determines whether or not there is a sufficient, time difference between the first, time $T_1$ and the second time $T_2$. Processing proceeds to step S11 to implement pass-through control when there is the predetermined time difference or greater between the first time $T_1$ and the second time $T_2$, or processing proceeds to step S12 to implement, side-by-side travel avoidance control when the difference between the first time $T_1$ and the second time $T_2$ is less than the predetermined time difference.

At step S11, similarly to in step S5 described above, the pass-through control section 36 guides the vehicle itself 12 such that the vehicle itself 12 passes by the side of the first other vehicle 80 while still traveling in the first lane 102 (see FIG. 7A and FIG. 7B).

At step S12, based on detection by the acquisition section 16, the side-by-side travel avoidance control section 42 operates the EPS system 24, the drive power control system 26, and the brake power control system 28 to guide the vehicle itself 12 such that the vehicle itself 12 accelerates or decelerates, and passes by the side of the first other vehicle 80 while avoiding drawing close to the second other vehicle 90 (see FIG. 8A and FIG. 8B).

When each of the steps above have completed, the travel control ECU 14 repeats the flow described above. Namely, since the travel situation of the travel path 100 on which the vehicle itself 12 is traveling undergoes changes from moment to moment, such as the first other vehicle 80 starting to move or the second other vehicle 90 accelerating, control content can be changed to match with the travel situation of the travel path 100 by repeating the flow described above.

Moreover, the give-way determination control section 44 of the travel control ECU 14 uses the rearward detection group 20 to monitor the behavior of the second other vehicle 90 during control, and performs interrupt processing when it has been determined that the behavior of the second other vehicle 90 is giving way for a lane change to the second lane 104. Then, the give-way determination control section 44 operates the EPS system 24, the drive power control system 26, and the brake power control system 28 to guide the vehicle itself 12 so that the vehicle itself 12 passes through the second lane 104 or by the side of the first other vehicle 80 (see FIG. 9A and FIG. 9B).

Note that there is obviously no limitation to the travel control processing flow described above. For example, the determination sequence of step S6 and step S7 may be reversed. Moreover, a table describing implementation conditions or priority ordering of the control content may be stored in memory, so that the travel control ECU 14 may reference the table during determination by the control determination section 32 to determine the control content.

As described above, the travel control unit 10 recognizes, as the surroundings information of the vehicle itself 12, detailed information regarding the first other vehicle 80 and the lane markings 106 of the first lane 102, and can determine in detail and with high precision whether or not the situation allows the vehicle itself 12 to travel safely. The vehicle itself 12 can thus be caused to travel smoothly. Thus, the travel control unit 10 computes the separation Y between the first other vehicle 80 and the lane markings 106, and when the separation Y is wider than the safe width $W_s$, it is possible to use the pass-through control section 36 to pass by the side of the first other vehicle 80 while maintaining the same lane of travel. In such cases, the vehicle itself 12 is caused to travel so as to pass between the first other vehicle 80 and the lane markings 106 without greatly distorting the travel path of the vehicle itself 12, and hindering of the second other vehicle 90 traveling in the second lane 104 is suppressed. This can contribute to smooth running on the travel path 100 overall. On the other hand, when the separation Y is narrower than the width of the vehicle itself 12 the vehicle itself 12 can be guided so as to enter the second lane 104 and avoid the first other vehicle 80.

Moreover, including the side-by-side travel avoidance control section 42 enables the travel control ECU 14 to avoid having the vehicle itself 12 travel side-by-side in the position by the side of the first other vehicle 80 at the same time as the second other vehicle 90. Accordingly, the users of the vehicle itself 12 and the second other vehicle 90 can travel on the travel path 100 more comfortably. Moreover, including the give-way determination control section 44 enables the travel control ECU 14 to cause the vehicle itself 12 to easily enter the second lane 104 and avoid the first other vehicle 80 when the second other vehicle 90 has permitted the vehicle itself 12 to enter the second lane 104. Moreover, including the accelerated lane-change control section 38 enables the travel control ECU 14 to cause the vehicle itself 12 to accelerate and change lanes into the second lane 104 sufficiently far ahead of the second other vehicle 90. Moreover, since the overtake lane-change control section 40 is included, when the second other vehicle 90 is drawing close to the vehicle itself 12, the travel control ECU 14 can guide the vehicle itself 12 to the second lane 104 after allowing the second other vehicle 30 to overtake. This enables contact with the first and second other vehicles 80 and 90 to be avoided even more safely.

The present disclosure is not limited to the embodiment described above, and it goes without saying that various modifications are possible with a scope that does not depart from the spirit of the present disclosure.

Other Embodiments

In the embodiment above, the travel control unit 10 is configured to implement various controls (pass-through control, accelerated lane-change control, overtake lane-change control, side-by-side travel avoidance control, and give-way determination control) together with implementation of control to autonomously change lanes. However, the travel control unit 10 can also implement the various controls described above when control other than the lane-change control is implemented, when avoiding an oncoming vehicle in an oncoming vehicle lane adjacent to the lane of travel in which the vehicle itself 12 is traveling, and in the case of manual driving.

For example, the travel control ECU 14 may also include a lane-change suppression control section 46 (see the dashed lines in FIG. 1) that suppresses lane changes when the second other vehicle 90 is present behind the vehicle itself 12 (in the second lane 104) while the user is manually causing the vehicle itself 12 to change lanes. Although the lane-change suppression control section 46 performs steering of the steering wheel 24a based on detection of the second other vehicle 90, when an obstacle (the first other vehicle 80) is present in the first lane 102 at this time, the lane-change suppression control section 46 may instead, for example, compare the safe width $W_s$ against the separation Y and switch to implementing the pass-through control. Moreover, the vehicle itself 12 may be accelerated and lane-change control implemented when the distance $X_2$ between the vehicle itself 12 and the second other vehicle 90 is a predetermined separation or greater, or the vehicle itself 12 may be decelerated and overtake lane-change control implemented when the distance $X_2$ between the vehicle itself 12 and the second other vehicle 30 is short. Naturally, the side-by-side travel avoidance control and the give-way determination control may also be implemented during lane-change suppression control.

Moreover, in cases in which the adjacent lane is an oncoming vehicle lane, an oncoming vehicle (the second other vehicle 30) can be detected by the forward detection group 18, and the distance $X_2$, the vehicle speed $V_2$, and the second time $T_2$ can be computed for the oncoming vehicle similarly to in the embodiment above, and control content can be determined from the position of the oncoming vehicle on a time axis. This enables lane-change control, pass-through control, accelerated lane-change control, overtake lane-change control, side-by-side travel avoidance control, and give-way determination control to be implemented. Moreover, when the user is performing manual driving, the travel control unit 10 may guide adjustments to the travel direction and vehicle speed by the user through a display section or speaker of the vehicle itself 12 while implementing the various controls described above.

Moreover, when implementing the various controls, not only can the travel control unit 10 adjust both the steering and vehicle speed of the vehicle itself 12 as described above, but the travel control unit 10 can also be configured to, for example, only perform steering of the vehicle itself 12. Namely, when the vehicle itself 12 is traveling, the travel control unit 10 can function as a travel assistance control system that assists the user with a portion of the driving (a semi-automated driving system). In such cases also, since the travel path for the vehicle itself 12 can be set by the travel control unit 10 steering the vehicle itself 12, the vehicle itself 12 can be caused to travel by appropriately selecting either a traveling position enabling obstacles in the first lane 102 to foe avoided, or a lane change to the second lane 104. Moreover, in cases in which acceleration or deceleration of the vehicle itself 12 is necessary, an instruction to accelerate or decelerate may be issued to the user from a display section or a speaker of the vehicle itself 12, enabling the vehicle itself 12 to be caused to travel at an appropriate vehicle speed. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:
1. A travel control device comprising:
a detector configured to acquire, as surroundings information of a subject vehicle while the subject vehicle is traveling, at least information regarding an obstacle existing ahead of the subject vehicle in a traveling direction, information regarding a width direction side edge of a travel lane in which the subject vehicle is traveling, and information regarding another vehicle traveling behind the subject vehicle in an adjacent lane adjacent to the travel lane; and
a travel controller configured to compute from the information acquired by the detector a distance between the obstacle and the width direction side edge, and to control travel of the subject vehicle by using the distance, wherein the travel controller calculates a time for the another vehicle to reach the subject vehicle when the another vehicle is detected traveling behind the subject vehicle in the adjacent lane, and sets the travel of the subject vehicle to avoid the obstacle and the another vehicle based on the calculated time.

2. The travel control device according to claim 1, wherein the travel controller includes a pass-through controller configured to implement a control to guide the subject vehicle so as to pass through between the obstacle and the width direction side edge when a width of the subject vehicle is narrower than the distance by a predetermined amount or greater.

3. The travel control device according to claim 2, wherein the travel controller includes a side-by-side travel avoidance controller configured such that when, based on the information, the another vehicle is detected traveling behind the subject vehicle in the adjacent lane with a possibility of a state of side-by-side travel with the another vehicle arising at the timing of the subject vehicle reaching the obstacle, the side-by-side travel avoidance controller controls to accelerate or decelerate the subject vehicle so as to avoid the side-by-side travel with the another vehicle.

4. The travel control device according to claim 1, wherein the travel controller includes a give-way determination controller configured such that when, based on the information, the another vehicle is detected traveling behind the subject vehicle in the adjacent lane and a behavior indicating the another vehicle permits the subject vehicle to enter into the adjacent lane is detected, the give-way determination controller controls to move the subject vehicle into the adjacent lane or to move the subject vehicle onto the width direction side edge.

5. The travel control device according to claim 1, wherein the travel controller includes an accelerated lane-change controller configured such that when, based on the information, the another vehicle is detected traveling behind the subject vehicle in the adjacent lane and the time for the another vehicle to reach the subject vehicle is longer than a predetermined threshold value, the accelerated lane-change controller controls to accelerate the subject vehicle and move the subject vehicle into the adjacent lane.

6. The travel control device according to claim 1, wherein the travel controller includes an overtake lane-change controller configured such that when, based on the information, the another vehicle is detected traveling behind the subject vehicle in the adjacent lane and the time for the another vehicle to reach the subject vehicle is shorter than a predetermined threshold value, the overtake lane-change controller controls to decelerate the subject vehicle and to move the subject vehicle into the adjacent lane after allowing the another vehicle to overtake.

7. The travel control device according to claim 1, wherein the travel controller includes a control determination section that includes a plurality of control content and that is configured to select one item of control content from out of the plurality of control content based on a state of the subject vehicle, the travel lane, the obstacle, and the another vehicle.

8. The travel control device according to claim 1, wherein the travel controller controls the travel of the subject vehicle to avoid the obstacle by using the distance.

9. The travel control device according to claim 6, wherein the travel controller includes a give-way determination controller configured such that when, based on the information, a behavior indicating the another vehicle permits the subject vehicle to enter into the adjacent lane is detected, the give-way determination controller interrupts the control being performed by the overtake lane-change controller and moves the subject vehicle into the adjacent lane or to move the subject vehicle onto the width direction side edge.

10. A vehicle control method executed by an on-board computer, the method comprising steps of:
acquiring, as surroundings information of a subject vehicle while the subject vehicle is traveling, at least information regarding an obstacle existing ahead of the subject vehicle in a traveling direction, information regarding a width direction side edge of a travel lane in which the subject vehicle is traveling, and information regarding another vehicle traveling behind the subject vehicle in an adjacent lane adjacent to the travel lane; and
computing from the acquired information a distance between the obstacle and the width direction side edge, and controlling travel of the subject vehicle by using the distance,
wherein the step of controlling further including calculating a time for the another vehicle to reach the subject vehicle when the another vehicle is detected, and setting the travel of the subject vehicle to avoid the obstacle and the another vehicle based on the calculated time.

11. A non-transitory computer readable medium storing a vehicle control program that causes an on-board computer to execute processing, the processing comprising steps of:
acquiring, as surroundings information of a subject vehicle while the subject vehicle is traveling, at least information regarding an obstacle existing ahead of the subject vehicle in a traveling direction, information regarding a width direction side edge of a travel lane in which the subject vehicle is traveling, and information regarding another vehicle traveling behind the subject vehicle in an adjacent lane adjacent to the travel lane; and
computing from the acquired information a distance between the obstacle and the width direction side edge, and controlling travel of the subject vehicle by using the distance,
wherein the step of controlling further including calculating a time for the another vehicle to reach the subject vehicle when the another vehicle is detected, and setting the travel of the subject vehicle to avoid the obstacle and the another vehicle based on the calculated time.

* * * * *